US006675705B2

(12) United States Patent
Yamamoto et al.

(10) Patent No.: US 6,675,705 B2
(45) Date of Patent: Jan. 13, 2004

(54) MICROPOROUS STENCIL SHEET PRINTING SYSTEM AND METHOD OF PRINTING

(75) Inventors: Yasuo Yamamoto, Ibaraki-ken (JP); Hideyuki Kinoshita, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 0 days.

(21) Appl. No.: 10/372,244

(22) Filed: Feb. 25, 2003

(65) Prior Publication Data

US 2003/0150340 A1 Aug. 14, 2003

Related U.S. Application Data

(62) Division of application No. 09/873,321, filed on Jun. 5, 2001, now abandoned.

(30) Foreign Application Priority Data

Jun. 22, 2000 (JP) .................................... P2000-188504

(51) Int. Cl.[7] ............................ B41N 1/24; B41M 1/12; B32B 3/26

(52) U.S. Cl. .............................. 101/128.4; 101/128.21; 101/129; 428/315.7

(58) Field of Search ............................ 101/127, 128.21, 101/128.4, 129, 114, 401.1; 428/315.7, 318.4

(56) References Cited

U.S. PATENT DOCUMENTS

| | | | | |
|---|---|---|---|---|
| 5,924,361 A | * | 7/1999 | Watanabe | 101/128.4 |
| 2003/0110962 A1 | * | 6/2003 | Kinoshita et al. | 101/128.21 |

* cited by examiner

*Primary Examiner*—Leslie J. Evanisko
(74) *Attorney, Agent, or Firm*—Nath & Associates PLLC; Marvin C. Berkowitz; Derek Richmond

(57) ABSTRACT

A microporous stencil sheet for use in stencil printing and methods for making stencil master using this microporous stencil sheet are disclosed herein. The microporous stencil sheet is for use in stencil printing using a low-viscosity ink with a viscosity ranging from 0.001 to 1 Pa·s, comprises an inelastic resin film and has an air permeability ranging from 1 to 600 seconds and a thickness ranging from 1 to 100 $\mu$m. The methods for making stencil master using this microporous stencil sheet comprise the step of closing the micropores of the stencil sheet in a non-printing portion of a desired printed image.

19 Claims, 1 Drawing Sheet

MICROPOROUS STENCIL SHEET PRINTING SYSTEM AND METHOD OF PRINTING

This application is a Divisional application of U.S. patent application Ser. No. 09/873,321 filed Jun. 5, 2001, now abondoned the entire contents of which are hereby incorporated by reference in their entirety.

BACKGROUND OF THE INVENTION

1. Field of the Invention

The present invention relates to a microporous stencil sheet for use as a master for stencil printing, and to a method for making a stencil master using the stencil sheet and a stencil master obtained by the method.

2. Description of the Related Art

Known stencil printing sheets (stencil sheets) used for stencil printing include heat-sensitive stencil sheets that comprise a thermoplastic film and a substrate tissue paper laminated together using an adhesive. These stencil sheets are perforated by irradiation with infrared rays or by the use of a thermal head (a thermal printing head) in order to make a master. As stencil printing ink, a water-in-oil emulsion ink is mainly used.

Stencil printing is effected by perforating a stencil sheet in a printing portion of a desired printed image to make a stencil master, and passing ink from the tissue paper side through the perforated portion of the master onto printing paper. In the following description, a printing portion refers to all parts to be printed of the printing paper. The amount of ink transferred (hereinafter referred to as "ink transfer amount") is controlled by, for example, the viscosity of ink, the density of tissue paper (to control the passing resistance of ink), the density of the perforated area of film, printing pressure, and printing pressure time.

In stencil printing, large amounts of ink are transferred to printing paper, requiring considerable time for the ink to permeate the printing paper. Improvement in drying property of such ink is therefore required. Specifically, the ink is resistant against permeating the surface of printing paper, and fingers become dirty when printed matter is touched immediately after printing. Additionally, the ink is transferred to, for example, the rubber rollers of a printing machine and then to printing paper, thereby making the printed matter dirty, if a second or further color is printed in color printing or if the reverse is printed in duplex printing, immediately after the first printing. Due to these problems, once the printing paper is printed in a first step, considerable time is required (e.g., from about 10 to about 20 minutes) before subjecting the work to the subsequent step. On the other hand, if the ink transfer amount is simply reduced, print quality is deteriorated such that the resulting printed image may appear blurred.

As a possible solution to the problem mentioned above, several techniques have been proposed in order to reduce the ink transfer amount without the deterioration of print quality, such as (1) a technique in which the density of tissue paper is increased to increase the passing resistance of ink, (2) a technique in which the element size of a thermal head is decreased to minimize the area perforated in thermal head master-making, and (3) a technique in which a product of printing pressure and printing pressure time is kept to minimum levels.

However, according to technique (1), the number of contact points between the film and tissue paper increases with the increase of tissue paper density, and molten components of the film tend to accumulate at these contact points, thereby deteriorating the perforating property in master-making, resulting in insufficient perforation. Additionally, open pore distribution of such tissue paper is difficult to control due to the manufacturing method of tissue paper; if the paper has a large distribution of open pores, variation in the perforation area can result. Accordingly, the resulting perforated stencil master has portions with high ink-permeability and with low ink-permeability, making the uniform transfer of ink difficult.

According to technique (2), by increasing the packing density of thermal head elements, a density (resolution) of up to 600 dpi is achieved. However, the resulting perforated pores are of sizes ranging from about 20 to about 40 $\mu$m, and are still insufficient to control the ink transfer amount, since the pore size must generally be 20 $\mu$m or less in order to reduce the ink transfer amount in printing using a low-viscosity ink.

According to technique (3), the mean ink transfer amount can be controlled. However, because the tissue paper has a large distribution of open pores, and the areas perforated by a thermal head vary, uneven amounts of ink are transferred, as described above. Therefore, this technique does not provide a solution to the problem that the drying property of ink is low in portions where large amounts of ink are transferred.

As a possible alternative solution to the above problem, an attempt has been made to decrease the viscosity of ink, to increase the permeability of ink through the printing paper, thereby improving the drying property. However, this is also not a practical solution, since the ink transfer amount increases with the decrease of ink viscosity, necessitating a further decrease in the perforation size of the stencil master, although there is a limit to how far the element density of a thermal head can be increased.

As described above, to date no printing technique has been proposed in stencil printing which can yield quick drying of printed matter while maintaining the quality of the printed image, without the use of a reactive ink such as an UV-curable ink.

SUMMARY OF THE INVENTION

Accordingly, an object of the present invention is to provide a microporous stencil sheet that can control the ink transfer amount when a low-viscosity ink with high permeability through printing paper is used, thus improving the quick-drying property of ink in stencil printing. Additionally, a further object of the present invention is to provide a stencil master and a method for making a stencil master using the microporous stencil sheet, that can be used for stencil printing using a low-viscosity ink.

The present inventors found that the use of an inelastic resin film with predetermined air permeability and thickness as a stencil sheet can control the ink transfer amount when a low-viscosity ink is used, and thereby accomplished the present invention.

Specifically, the present invention provides, as an aspect, a microporous stencil sheet composed of an inelastic resin film for use in stencil printing using a low-viscosity ink of a viscosity ranging from 0.001 to 1 Pa·s. This microporous stencil sheet has an air permeability ranging from 1 to 600 seconds and a thickness ranging from 1 to 100 $\mu$m. The stencil sheet satisfying such requirements can appropriately control the ink transfer amount of a low-viscosity ink of a viscosity of 0.001 to 1 Pa·s, which is highly permeable through printing paper. Consequently, the drying property of ink in printed matter can be markedly improved as compared with conventional inks (viscosity: 2 to 10 Pa·s). Additionally, the ink transfer amount can be reduced, thereby preventing running of the ink on printed matter. The film constituting the stencil sheet is composed of an inelastic resin, and even when it is pressed against, for example, a thermal head for heat fusion, the film is not deformed, thereby yielding an increased precision in master-making. Furthermore, no deformation of printed images occurs even when stencil printing is performed at a high printing pressure.

In another aspect, the present invention provides a method for making a stencil master using a microporous stencil sheet, in which the microporous stencil sheet includes a thermoplastic resin film and has an air permeability ranging from 1 to 600 seconds and is of a thickness ranging from ito 100 μm. The method includes the step of closing the micropores of the microporous stencil sheet in a non-printing portion of a desired printed image by heat fusion. thereby making it ink-impermeable. By closing the micropores of the non-printing portion in this manner, a stencil master can be made as a mirror image so that ink permeates the micropores of the stencil sheet only in the printing portion.

In a further aspect, the present invention provides a method for making a stencil master using a microporous stencil sheet, in which the microporous stencil sheet has an air permeability ranging from 1 to 600 seconds and is of a thickness ranging from 1 to 100 μm. This method includes the step of closing the micropores of the microporous stencil sheet in a non-printing portion of a desired printed image by deposition of a resin and/or wax, thereby making it ink-impermeable. In this method, the resin and/or wax is preferably deposited from a thermal transfer sheet by fusion transfer, thereby closing the micropores.

The present invention also provides a stencil master obtained by the methods mentioned above.

DESCRIPTION OF THE PREFERRED EMBODIMENTS

Figure 1:
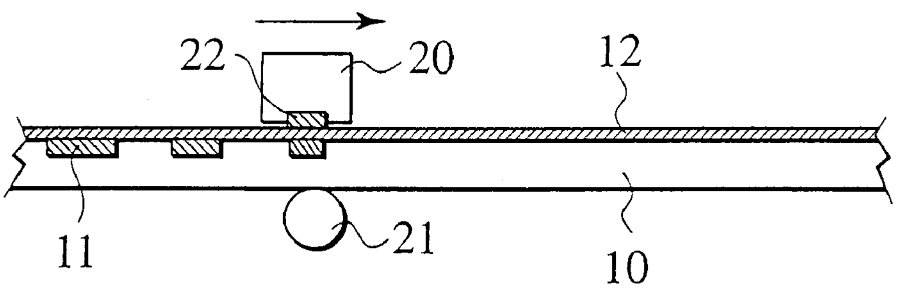
FIG. 1 is a schematic diagram showing master-making using a thermal head, as an embodiment of a method for making a master according to the present invention.

The embodiments of the present invention will be illustrated in detail with reference to the attached drawings.

The microporous stencil sheet (hereinafter simply referred to as "stencil sheet") of the present invention is composed of an inelastic resin film and is used for stencil printing using a low-viscosity ink of a viscosity ranging from 0.001 to 1 Pa·s. This stencil sheet has an air permeability ranging from 1 to 600 seconds and is of a thickness ranging from 1 to 100 μm.

Permeability of ink through printing paper increases with the decrease of ink viscosity, and the ink cannot sufficiently permeate printing paper if the viscosity exceeds 1 Pa·s. When a higher drying property (quick drying property) of ink is required, the ink preferably has a viscosity of 0.1 Pa·s or less. The ink preferably has a surface tension of $5\times10^{-2}$ N/m or less, or more preferably $4\times10^{-2}$ N/m or less, for yielding satisfactory ink-permeability. When pigments are used as a coloring agent of the ink, such pigments with larger particle size may clog the micropores of stencil sheet, and pigments that have a small particle size and are dispersible are preferred. Alternatively, dyes can be advantageously used for the coloring agent. Other components of the ink such as vehicles and additives are not specifically limited. The ink is not limited to a stencil printing ink and also includes, for example, a water-based ink and an oil-based ink for use in the ink-jet process or in stamping.

To control the transfer amount of such low-viscosity ink, the stencil sheet has an air permeability within the range specified above. Herein, "air permeability" refers to the degree of air passing at a predetermined differential pressure and is determined using a Gurley densometer according to the method described in Japanese Industrial Standards (JIS) P 8117. If the air permeability exceeds 600 seconds, the ink resists permeating the stencil sheet, which is impractical. If it is less than 1 second, it is difficult to control the ink transfer amount.

The stencil sheet is of a thickness within the above-specified range. If the thickness of stencil sheet exceeds 100 μm, ink-permeability is reduced, causing insufficient uniformity in solid print, and the stencil sheet becomes so firm as to deteriorate contact with the heating means, such as a thermal head, and reduce operability in the master-making process. If the thickness is less than 1 μm, a sufficient strength cannot be ensured and is not practical. In order to ensure good operability, the stencil sheet preferably has a thickness of 10 μm or more.

The micropores of the stencil sheet are pores that penetrate the stencil sheet from one face to the other and allow the ink to pass therethrough. The sizes of such micropores can be freely selected depending on the viscosity or surface tension of the low-viscosity ink used, but the mean pore size as determined using a mercury penetration system porosimeter is referably about 0.01 μm or more to ensure satisfactory ink-permeability and is preferably about 10 iim or less to ensure control of the transfer amount, when the ink is of a very low viscosity. The mean pore size is more preferably in the range of about 0.01 jim to about 1 jim. When the stencil sheet has micropores ordered from submicrons to microns in a high density, solid printing can be easily performed even on printing paper that is resistant to the spread of ink. Such micropores are preferably formed by stretching out (drawing) the inelastic resin film in at least one axial direction.

The porosity of the stencil sheet is not specifically limited, but is preferably 40% or more to ensure satisfactory ink-permeability and is preferably 90% or less to ensure satisfactory strength.

Regarding surface roughness, the stencil sheet preferably has a ten point average roughness (height) Rz of 20 μm or less, as determined according to the method described in JIS B 0601. Within this range, the stencil sheet has satisfactory contact with the heating means such as a thermal head in master-making, with satisfactory transference from a thermal transfer sheet in order to close the pores. Additionally, if the surface roughness is excessively high, gaps (protrusions and depressions) between the printing paper and the stencil sheet can become too large, with excess ink being supplied to such gaps thereby excessively increasing the ink transfer amount.

The polymer material of the inelastic resin film constituting the stencil sheet is not specifically limited, but is preferably a thermoplastic resin enabling master-making by heat fusion. Such resins include, but are not limited to, polyethylenes, polypropylenes, and other polyolefins; poly (ethylene terephthalate), poly(butylene terephthalate), and other polyesters; nylon-6,6 (polyamide-6,6), nylon-12 (polyamide 12) and other polyamides; poly(vinyl chloride), poly(vinylidene chloride) or copolymers thereof, and other chlorine-containing resins; polytetrafluoroethylene, tetrafluoroethylene-ethylene copolymers, and other fluororesins. Of these, polyolefins are favored, of which polyethylenes are typically preferred. Each of these inelastic resins can be used either singly or in combination as a multi-layer structure.

Such preferred polyethylenes for use in the invented stencil sheet include, for example, polyethylenes for use in a filter membrane. Specifically, preferred polyethylenes are polyethylene homopolymers having a density varying from high to low, as well as copolymers (linear copolymerized polyethylenes) containing α-olefin unit such as propylene, butene, pentene, hexene, and octene. The content of comonomers in these copolymers is preferably about several mole percent (e.g., 4 mole percent or less) relative to ethylene unit. The inelastic resin film may comprise component mixed with polyethylene, selectable from materials such as polypropylenes, high density polyethylene, medium density polyethylene, linear low density polyethylene, ethylene-propylene copolymers, and other polyolefins. In this case, the content of the other polyolefins than polyethylene is preferably 30% by weight or less.

The molecular weight of the polymer is not specifically limited and is freely selected depending on the type of resin from the viewpoints of, for example, fracture strength of the film and operability in manufacture. For example, in the case of polyethylene, the polyethylene preferably has a weight average molecular weight (Mw), as determined by gel permeation chromatography using a standard polystyrene calibration curve of $10\times10^4$ or more to ensure satisfactory fracture strength when the film is stretched out, and of $400\times10^4$ or less to ensure easy preparation of the resin solution in film formation. The weight average molecular weight ranges more preferably from $20\times10^4$ to $70\times10^4$, with typical preferences from $25\times10^4$ to $50\times10^4$. Alternatively, the weight average molecular weight can be maintained within the preferred range by means of, for example, blending or multistage polymerization.

The resin may further comprise, as required, various additives to a degree that does not hinder the formation of pores and the characteristics of the resulting stencil sheet. Such additives include, but are not limited to, dispersing agents, thixotropy-imparting agents, defoaming agents, leveling agents, diluents, plasticizers, antioxidants, fillers, and coloring agents.

A film (stencil sheet) using such a resin can be prepared or formed by a conventional method such as a casting process (T-die process) using a molten polymer. Alternatively, the stencil sheet may be prepared by sintering resin particles onto the sheet.

The micropores in the resulting film can be formed by any method such as a conventional microvoid formation method or solvent extraction method. For example, fine rips (microvoids) are formed in the boundaries between crystal regions and non-crystal regions by subjecting the film to heat treatment to form microcrystals, and stretching out the resulting film in at least one axial direction. Such microvoids can also be formed by adding fillers to a molten polymer during the preparation of film, and stretching out the prepared film in at least one axial direction to form microvoids in the filler portions. Alternatively, a polymer and a solvent are heated and melted to form a film, and the film is cooled to phase-separate the solvent, and the resulting film is stretched out. In this procedure, the solvent is extracted prior to or subsequent to stretching. Inorganic fillers may be added in this procedure to improve the dispersibility of the resin, thereby increasing pore-formation.

Films for use in the invented stencil sheet can be prepared in the aforementioned manner, and are also commercially available as porous plastic films such as "HIPORE" available from Asahi Chemical Industry Co., Ltd., "NF Sheet" (a microporous polypropylene sheet) and "PORUM" (a microporous polyethylene sheet) both available from Tokuyama Corporation, "SUN-MAP" (a sintered polyethylene sheet), "MICROTEX" (a tetrafluoroethylene resin sheet), and "BREATHRON" (a porous polyethylene sheet) all available from Nitto Denko Co., Ltd., "PERMILAN" (a porous polyolefin sheet) available from Maruzen Polymer K.K., "ESPOIR" (a porous polyolefin sheet) available from Mitsui Chemicals, Inc., and "U-PORE" (a microporous polyethylene sheet) available from Ube Industries, Ltd.

The stencil sheet is preferably a stretched film (drawn film). When a plastic film is stretched out in a predetermined direction during manufacture, the resulting film tends to shrink in the opposite direction when heated after manufacture. Accordingly, when such a stencil sheet that has been made heat-shrinkable by stretching is used, the micropores can be efficiently closed by heat fusion in master-making using the heat generated from a thermal head.

When heat fusion in master-making is performed using electromagnetic waves, the stencil sheet preferably has a photo-thermal conversion substance on the surface or inside of the sheet. Herein, "photo-thermal conversion substance" refers to a compound that can transform light energy into heat energy upon irradiation of electromagnetic waves of an selectable wavelength, and includes any light absorbers depending on the wavelength. The stencil sheet also preferably has an antistatic agent on the surface or inside of the sheet, in order to avoid the damaging transfer of the sheet caused by static electricity. In these embodiments, if the stencil sheet has a photo-thermal conversion substance and/or antistatic agent on the surface thereof, a layer containing at least such ingredient is formed on the surface of the stencil sheet by any means such as coating or painting. If the stencil sheet has the ingredient inside thereof, the ingredient is contained within the sheet, namely the resin constituting the film includes the ingredient in any form.

When the stencil master is made by irradiation with electromagnetic waves, the preferred photo-thermal conversion substances are substances that can efficiently transform light energy into heat energy, such as carbon black, silicon carbide, silicon nitride, metallic powders, metal oxides, inorganic pigments, organic pigments, and organic dyes. Of these, substances that can greatly absorb light of a specific region of wavelength are typically preferred, such as phthalocyanine dyes, cyanine dyes, squalirium dyes, and polymethine dyes. Each of these photo-thermal conversion substances can be used singly or in combination.

Antistatic agents used for antistatic purpose include a variety of surfactants. Such surfactants include, but are not limited to, fatty acid salts, higher alcohol sulfates, fatty acid amines, fatty acid amide sulfonates, fatty acid amide sulfates, aliphatic alcohol phosphates, and other anionic surfactants; aliphatic amines, quaternary ammonium salts, alkylpyridinium salts, and other cationic surfactants; polyoxyethylene alkyl ethers, polyoxyethylene alkyl phenol ethers, polyoxyethylene alkyl esters, sorbitan alkyl esters, and other nonionic surfactants; imidazoline derivatives, higher alkylamine (betaine) type amphoteric surfactants, sulfate phosphate type amphoteric surfactants, sulfonate type amphoteric surfactants, and other amphoteric surfactants. Each of these substances can be used singly or in combination.

The micropores of the stencil sheet are pores that penetrate the stencil sheet from one face to the other and allow the ink to pass therethrough. The sizes of such micropores can be freely selected depending on the viscosity or surface tension of the low-viscosity ink used, but the mean pore size as determined using a mercury penetration system porosimeter is referably about 0.01 μm or more to ensure satisfactory ink-permeability and is preferably about 10 iim or less to ensure control of the transfer amount, when the ink is of a very low viscosity. The mean pore size is more preferably in the range of about 0.01 jim to about 1 jim. When the stencil sheet has micropores ordered from submicrons to microns in a high density, solid printing can be easily performed even on printing paper that is resistant to the spread of ink. Such micropores are preferably formed by stretching out (drawing) the inelastic resin film in at least one axial direction.

In a preferred embodiment, the stencil sheet has a releasing layer on the surface thereof, which releasing layer contains a release agent selected from among silicone-based release agents, fluorine-based release agents, wax-based release agents, and surfactant-based release agents. The formation of the releasing layer prevents fusion to a heating means and the heat shrinkage of a molten stencil sheet when the stencil master is made by closing the micropores of the stencil sheet by heat fusion method. Such release agents include, but are not limited to, silicone oil and other silicone-based release agents, fluorine-based release agents, aqueous emulsion wax and other wax-based release agents, and phosphate-based surfactants and other surfactant-based release agents. Each of these release agents can be used singly or in combination.

Of these release agents, silicone-based release agents are desirable, of which a release agent containing a silicone phosphate ester as a principal component is typically preferred. The silicone phosphate ester concurrently has satisfactory lubricating property and releasing property due to a silicon oil moiety, and satisfactory antistatic property and adhesion to the substrate due to a phosphate ester moiety. Additionally, the silicone phosphate ester is in the state of liquid at ambient temperature, and no melting scum adheres to the heating means such as a thermal head. Specifically, the silicone phosphate ester can preferably be obtained by copolymerization between dimethylpolysiloxane and a polyol such as a (polyoxyalkylene)olefin alcohol phosphate ester, and is represented by the following Formula (1):

(1)

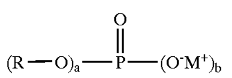

wherein each of a and b is an independent integer of 1 or 2, where a plus b equals 3; M is H, Na, K, Li or $NH_4$; R is represented by the following Formula (2) when a polyol phosphate ester is introduced into a side chain of dimethylpolysiloxane, and R is represented by the following Formula (3) when a polyol phosphate ester is introduced into an end of dimethylpolysiloxane:

R: Formula (2)

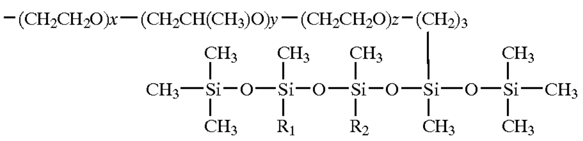

R: Formula (3)

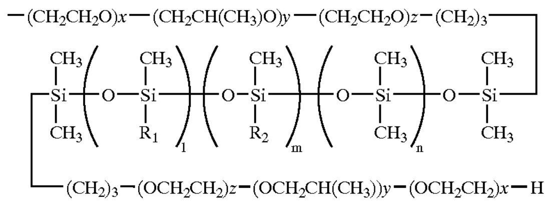

wherein x, y and z each are independent values from 0 to 20, with x+y+z preferably values from 1 to 5; l, m and n each are independent values from 0 to 200; $R_1$ is $-(CH_2)_pCH_3$ or a phenyl group, where p is a value from 0 to 10, and preferably p is 0 (i.e., $R_1$ is preferably a methyl group); $R_2$ is $-(CH_2)_3-(OCH_2CH_2)_s-(OCH_2CH(CH_3))_r-(OCH_2CH_2)_q-OH$, where q, r and s each are independent values from 0 to 20.

An example of the silicone phosphate ester is dimethicone copolyol phosphate ester.

The release agent can be applied by any technique that is not specifically limited. For example, an ingredient containing the release agent is dispersed or dissolved in a solvent freely selectable, and the resulting dispersion or solution being applied using a roller coater, gravure coater, reverse coater, or bar coater, and the solvent is then vaporized. The application can be performed at any step before or after the formation of micropores. The coating amount of the releasing layer formed preferably ranges from about 0.001 to about 0.5 $g/m^2$, in order to yield a sufficient releasing property without hindering ink-permeability.

The releasing layer containing the release agent may further comprise additional ingredients within a range that does not adversely affect the objects of the present invention. Such additional ingredients include, for example, antistatic agents as mentioned above, heat-fusible substances, and binder resins.

Next, the embodiments of a method for making a stencil master according to the invention will be described.

The master-making method is a method for making a stencil master using microporous stencil sheet, which comprises a thermoplastic resin film and has an air permeability ranging from 1 to 600 seconds and is of a thickness ranging from 1 to 100 μm. This method includes the step of closing, by heat fusion, the micropores of the microporous stencil sheet in a non-printing portion of a desired printed image to form an ink-impermeable portion. In the aforementioned master-making, the micropores in the non-printing portion should be closed at least in the face used for master-making and not be penetrating from one face of the stencil sheet to the other. That is, the non-master-making face of the stencil sheet may have pores left on its entire face.

As a heating means for use in the heat fusion operation, it is preferable for a thermal head to be employed for ease and precision control in the master-making operation based on electronic data, thereby yielding clear printed images. The thermal head may be a line thermal head or a serial thermal head.

FIG. 1 is a schematic diagram showing the master-making operation by heat fusion of a microporous stencil sheet using a thermal head. Microporous stencil sheet 10 is fed by a feeding roller that can be freely selected (not shown in the figure) through to an image formation unit composed of thermal head 20 and platen roller 21. The surface (master-making face) of microporous stencil sheet 10 is fused or melted by heat from heating element 22 of thermal head 20 to form a closed portion (non-printing portion) 11 with closed micropores. Heating element 20 generates heat based on image signals. In this embodiment, microporous stencil sheet 10 has releasing layer 12 to avoid the fusion of the sheet to the thermal head.

In another embodiment, the heat fusion operation can be performed by irradiation with electromagnetic waves selectable from, for example, γ-rays, X-rays, ultraviolet rays, visible rays, and laser light. In this case, it is required to use the stencil sheet having the photo-thermal conversion substance.

Figure 2:
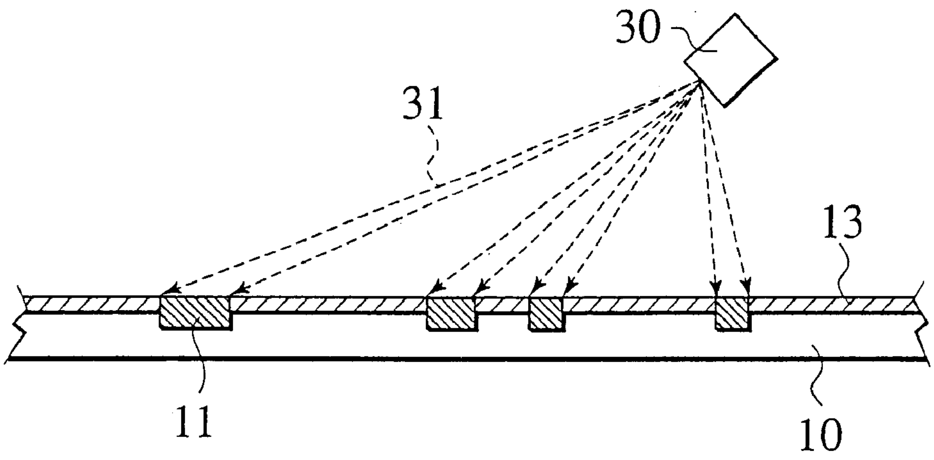
FIG. 2 is a schematic diagram showing master-making using semiconductor laser, as an embodiment of a method for making a master according to the present invention.

FIG. 2 is a schematic diagram showing the master-making operation by heat fusion of a microporous stencil sheet by irradiation with electromagnetic waves. Infrared rays 31 which are condensed to a beam spot diameter of 50 $\mu$m is irradiated from semiconductor laser 30 onto the surface of microporous stencil sheet 10, according to image signals. Then, heat energy is generated in a portion exposed to the infrared rays by the action of photo-thermal conversion substance layer 13 formed on the surface of microporous stencil sheet 10, and the exposed portion of stencil sheet 10 is fused by heat to form a closed portion (non-printing portion) 11.

In yet another embodiment of the master-making method, the micropores of a microporous stencil sheet are closed to form an ink-impermeable portion by the deposition of a resin and/or a wax onto a non-printing portion of a desired printed image, instead of closing the micropores by heat fusion. In this procedure, the resin and/or wax is preferably fused and transferred from a thermal transfer sheet using, for example, a thermal head to deposit the resin and/or wax onto a non-printing portion of the stencil sheet. By allowing part of the deposited resin and/or wax to penetrate the micropores, the micropores can be closed more securely. Alternatively, the micropores can be closed by transferring a plain paper copier (PPC) toner and melting the transferred toner.

The aforementioned resin includes, but is not limited to, polyolefin resins, vinyl acetate resins, polyacrylic resins, polyamide resins, polyester resins, polyurethane resins, polystyrene resins, petroleum resins, and rubber (gum) resins. The wax includes, for example, natural waxes of vegetable origin, of animal origin, and of mineral origin, petroleum waxes, synthesized hydrocarbon waxes, modified waxes (denatured waxes), hydrogenated waxes, and fatty acid amide waxes. Each of these substances can be used singly or in combination.

Figure 3:
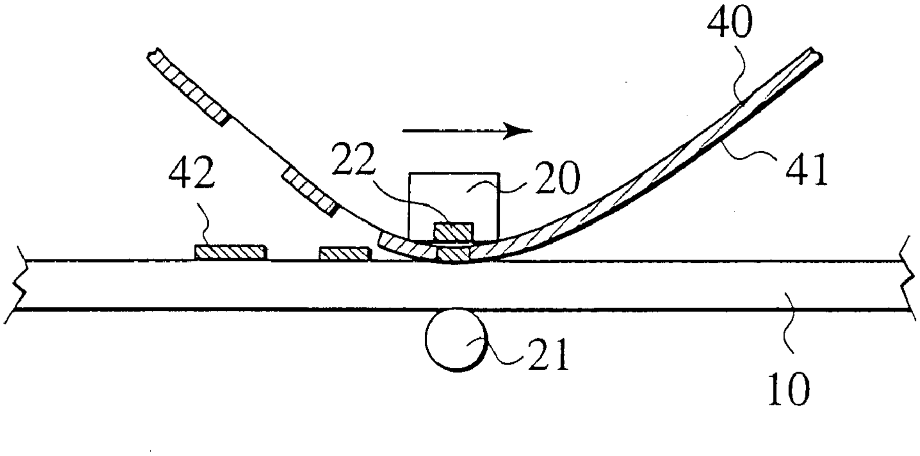
FIG. 3 is a schematic diagram showing master-making using a thermal transfer sheet and thermal head, as an embodiment of a method for making a master according to the present invention.

FIG. 3 is a schematic diagram showing the master-making operation by the fusion and transference of resin from a thermal transfer sheet using a thermal head, thereby making a master from a microporous stencil sheet. Microporous stencil sheet 10 is fed by a feeding roller which is freely selectable (not shown in the figure) through to an image forming unit composed of thermal head 20 and platen roller 21. By means of the heat from heating element 22 of thermal head 20, which generates heat based on image signals, part of thermal transfer layer 41 of thermal transfer sheet 40 is transferred onto the surface (master-making face) of microporous stencil sheet 10 to form a thermal transferred region 42. A portion in which micropores are closed (non-printing portion) is formed under the thermal transferred region 42.

Stencil printing using the above-prepared master is performed in the following manner. The master-making face of the stencil master is superposed on printing paper, a low-viscosity ink is supplied from the opposite (non-master-making face) side of the stencil master under a pressure, and the ink penetrates through the micropores of the stencil sheet which have not been closed (corresponding to the printing portion) and is transferred to the printing paper. Practical printing techniques are not specifically limited. For example, continuous printing may be performed by winding the master around the drum of a stencil printing device and supplying ink from inside the drum; or alternatively, press printing may be performed using a home-use portable stencil printing device such as "PRINT GOKKO" (trademark, a product of Riso Kagaku Corporation). In this procedure, the ink can be supplied by impregnating an article with the ink, which article is made of an open-celled material and can be impregnated with the ink (e.g., sponge rubber made from a natural rubber or synthetic rubber, or formed synthetic resin), superposing the impregnated article with the non-master-making face of the master, and pressing the resulting laminate.

EXAMPLES

The present invention will be illustrated in further detail below with reference to several examples which are not intended to limit the scope of the invention.

As stencil sheets, microporous polyethylene films each having the thickness, mean pore size, porosity, air-permeability, and surface roughness indicated in Table 1 were used (Example 1: HIPORE H 3050, Example 2: HIPORE H 6022, Example 3: HIPORE 4050 U3, Example 4: U-PORE upz 063, Example 5: HIPORE HN710, Example 6: U-PORE UP 2015, Example 7: HIPORE X 9817, Example 8: HIPORE H 1100A, Comparative Example 1: HIPORE H 1080C, Comparative Example 2: SUN-MAP LC). "HIPORE", "U-PORE" and "SUN-MAP" are trade names of Asahi Chemical Industry Co., Ltd., of Ube Industries, Ltd., and of Nitto Denko Co., Ltd., respectively. The preparation method of each film is also shown in Table 1. The porosity was calculated from the volume and weight of a 10 cm square cut of the stencil sheet according to the following equation:

$$\text{Porosity}(\%)=\{\text{volume}(cm^3)-\text{weight}(g)/\text{density}\}/\text{volume}(cm^3)\times 100$$

1. Evaluation on Covering Property

The micropores of each of the films in an area of about 15 cm×15 cm were closed (i.e., a blank master was made) in the following manner.

{Master-making 1}: The micropores of each film were closed with a wax using a thermal transfer printer MD 5500 (manufactured by Alps Electric Co., Ltd.) and a printer ribbon for MD 5500 (Model: MDC-FLK3).

{Master-making 1}: A elease aent solution comprising 1.0 part by weight of dimethicone copolyol phosphate ester (Pecosil PS-200, a product of Phoenix Chemical Incorp.) and 99.0 parts by weight of isopropyl alcohol was applied onto each film using a wirebar to form a releasing layer with a dry weight of 0.05 g/m2. The pores of each film with releasing layer were closed by heat fusion using PRINT GOKKO digital master-making device (with a thermal head, a product of Riso Kagaku Corporation).

Using the masters prepared by Master-making 1 and Master-making 2, a printing test was performed in the following manner, and the covering property (pore-closing property) of pores of each film was visually observed and evaluated according to the following criteria.

{Printing}: Each of the masters prepared by Master-making 1 and Master-making 2 was set in a frame and was then set in PRINT GOKKO PG-11 (trademark of Riso Kagaku Corporation). Stencil printing was performed using this master and an ink-impregnated article. The article was obtained by impregnating an open-celled sponge ("Rubycell", a product of Toyo Polymer Co., Ltd.) with a water-based dye ink (IC l-BKO5, ink for Epson IJ Printer) having a surface tension of $3.2\times10^{-2}$ N/in and a viscosity of $3.2\times10^{-3}$ Pa·s.

Covering Property of Pores

- E: pores are entirely closed and the ink is not transferred to printed matter
- G: the master has some pinholes (some dots in printed matter) but to a degree negligible in practical use
- NG: the master has noticeable pinholes (printed matter has noticeable dots)

2. Printability Evaluation

Master-making and printing of each of the films were performed in the following manner using a draft having both solid portion and character portion from 6 to 10.5 points, and having an printed area percentage of 25%.

{Master-making 1}: A wax image (a negative picture of draft) was formed on each film using the aforementioned thermal transfer printer and printer ribbon to make a master.

- G: solid areas are somewhat uneven but to a degree negligible in practical use
- NG: ink permeates insufficiently, and solid areas have noticeable unevenness in density {Image Quality: evaluation of character portion of printed matter}

- E: printed image has no running of ink and is sharp
- G: printed image has slight running and blurring but to a degree negligible in practical use
- NG: printed image has clearly observable running and blurring {Ink Drying Property: the character portion of a printed matter was rubbed with fingers, and smear was evaluated}

- E: printed matter does not become dirty, with no smearing
- G: printed matter becomes somewhat dirty but to a degree negligible in practical use
- NG: printed matter becomes noticeably dirty with smearing The results are shown in Table 1. The results obtained in Master-making method 1 and Master-making method 2 were the same in each evaluation item.

TABLE 1

| | Stencil Sheet | | | | | | Result | | | |
|---|---|---|---|---|---|---|---|---|---|---|
| | Thickness (μm) | Air-permeability (sec) | Mean Pore Size (μm) | Porosity (%) | Surface Roughness (Rz) | Manufacture Method | Covering Property | Ink-permeability | Image Quality | Ink Drying Property |
| Ex. 1 | 50 | 10 | 0.1 | 90 | 13.867 | biaxial stretching | E | E | E | E |
| Ex. 2 | 27 | 90 | 0.1 | 50 | 3.143 | biaxial stretching | E | E | E | E |
| Ex. 3 | 50 | 120 | 0.1 | 70 | 13.467 | biaxial stretching | E | E | E | E |
| Ex. 4 | 24 | 250 | 0.19 | 49 | 1.197 | uniaxial stretching | E | E | E | E |
| Ex. 5 | 25 | 450 | 0.05 | 40 | 2.613 | biaxial stretching | E | G | G | E |
| Ex. 6 | 25 | 600 | 0.17 | 45 | 2.303 | uniaxial stretching | E | G | G | E |
| Ex. 7 | 39 | 600 | 0.05 | 42 | 3.353 | biaxial stretching | E | G | G | E |
| Ex. 8 | 100 | 600 | ≦0.1 | 55 | 2.327 | biaxial stretching | E | G | G | E |
| Com. Ex. 1 | 85 | 2000 | ≦0.1 | 46 | 2.673 | biaxial stretching | E | NG | NG | E |
| Com. Ex. 2 | 100 | <1 | 30 | 30 | 39.5 | no stretching (sintering) | NG | E | NG | G |

{Master-making 2.1}: Master-making was performed by reversing a negative picture to a positive picture on each of the aforementioned films with releasing layer using the same PRINT GOKKO digital master-making device as above.

Printing was performed in the same manner as above using the prepared master, and ink-permeability, image quality and ink-drying property of the obtained printed matter were visually observed and evaluated according to the following criteria.

{Ink-permeability: evaluation of solid portion of printed matter}

- E: ink permeates well, and solid areas are uniformly formed

The stencil sheets according to the invented examples had satisfactory covering property and high ink-permeability, and the resulting printed matter exhibited satisfactory solid closed portion and character portion. Additionally, even when the printed matter was rubbed with fingers immediately after printing, the printed image was not disturbed. In contrast, in Comparative Example 1 using a stencil sheet with air-permeability of 2000 seconds, the ink-permeability was not good and the image quality was deteriorated (blurred). In Comparative Example 2 using a stencil sheet with air-permeability of less than 1 second, the ink-permeability could not be sufficiently controlled, and an excessive amount of ink permeated the master, causing running of ink in the printed image. Additionally, the stencil sheet according to this comparative example had a poor covering property. This is probably because the film used was not a stretched film, and the covering property was affected by, for example, the pore size and surface roughness of the film.

The present disclosure relates to subject matter contained in Japanese Patent Application No.2000-188504, filed on Jun. 22, 2000, the disclosure of which is expressly incorporated herein by reference in its entirety.

Other embodiments and variations will be obvious to those skilled in the art, and this invention is not to be limited to the specific matters stated above.

What is claimed is:

1. A printing system comprising:

a stencil master made of a microporous stencil sheet having micropores, the stencil sheet having an air permeability ranging from 1 to 600 seconds and a thickness ranging from 1 to 100 μm; and an ink with a viscosity ranging from 0.00 1 to 1 Pa·s.

2. A printing system according to claim 1, wherein the microporous stencil sheet comprises a polyolefin film.

3. A printing system according to claim 1, wherein the micropores of the microporous stencil sheet have a mean pore size ranging from 0.01 to 10 μm.

4. A printing system according to claim 1, wherein the microporous stencil sheet comprises a resin film and has the micropores formed by stretching out the resin film in at least one axial direction.

5. A printing system according to claim 1, wherein the microporous stencil sheet has at least one of a photo-thermal conversion substance and an antistatic agent on the surface of or mixed within the microporous stencil sheet.

6. A printing system according to claim 1, wherein the microporous stencil sheet has a releasing layer on a surface thereof, the releasing layer comprising a release agent selected from the group consisting of silicone-based release agents, fluorine-based release agents, wax based release agents, and surfactant-based release agents.

7. A printing system according to claim 1, wherein the releasing layer comprises a release agent containing a silicone phosphate ester as a principal component.

8. A method for making a printed matter, comprising the steps of:

making a master using a microporous stencil sheet having micropores, the stencil sheet having an air permeability ranging from 1 to 600 seconds and a thickness ranging from 1 to 100 μm;

superposing a master-making face of the master on a printing paper; and supplying an ink with a viscosity ranging from 0.00 1 to 1 Pa·s from a non master-making face of the master to transfer the ink onto the printing paper.

9. A method according to claim 8, wherein the microporous stencil sheet comprises a polyolefin film.

10. A method according to claim 9, wherein the master is made by closing the micropores of the microporous stencil sheet in a non-printing portion of a desired printed image by heat fusion of the polyolefin film to form an ink-impermeable portion.

11. A method according to claim 10, wherein the heat fusion is performed by heat generated from a thermal head.

12. A method according to claim 10, wherein the microporous stencil sheet has a photo-thermal conversion substance on the surface of or mixed within the microporous stencil sheet, and the heat fusion is performed by irradiation with electromagnetic waves.

13. A method according to claim 8, wherein the micropores of the microporous stencil sheet have a mean pore size ranging from 0.01 to 10 μm.

14. A method according to claim 8, wherein the microporous stencil sheet comprises a resin film and has the micropores formed by stretching out the resin film in at least one axial direction.

15. A method according to claim 8, wherein the microporous stencil sheet has at least one of a photo-thermal conversion substance and an antistatic agent on the surface of or mixed within the microporous stencil sheet.

16. A method according to claim 8, wherein the microporous stencil sheet has a releasing layer on its a surface thereof, the releasing layer comprising a release agent selected from the group consisting of silicone-based release agents, fluorine-based release agents, wax-release agents, and surfactant-based release agents.

17. A method according to claim 16, wherein the releasing layer comprises a release agent containing a silicone phosphate ester as a principal component.

18. A method according to claim 8, wherein the master is made by closing the micropores of the microporous stencil sheet in a non-printing portion of a desired printed image by deposition of a resin, wax, or both to form an ink-impermeable portion.

19. A method according to claim 18, wherein the resin, wax or both are deposited from a thermal transfer sheet by fusion transfer.

* * * * *

UNITED STATES PATENT AND TRADEMARK OFFICE

CERTIFICATE OF CORRECTION

PATENT NO. : 6,675,705 B2
DATED : January 13, 2004
INVENTOR(S) : Yamamoto et al.

It is certified that error appears in the above-identified patent and that said Letters Patent is hereby corrected as shown below:

Column 13,
Line 40, change "1" to -- 6 --.

Column 14,
Line 31, change "its a" to -- a --.

Signed and Sealed this

Fourth Day of May, 2004

JON W. DUDAS
*Acting Director of the United States Patent and Trademark Office*